United States Patent
Mishra et al.

(10) Patent No.: US 9,684,487 B2
(45) Date of Patent: Jun. 20, 2017

(54) LINE-MULTIPLEXED UART

(71) Applicant: QUALCOMM Incorporated, San Diego, CA (US)

(72) Inventors: Lalan Jee Mishra, San Diego, CA (US); Richard Dominic Wietfeldt, San Diego, CA (US); George Alan Wiley, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 364 days.

(21) Appl. No.: 14/631,078

(22) Filed: Feb. 25, 2015

(65) Prior Publication Data

US 2016/0246570 A1    Aug. 25, 2016

(51) Int. Cl.
| | |
|---|---|
| G06F 13/00 | (2006.01) |
| G06F 5/16 | (2006.01) |
| G06F 13/40 | (2006.01) |
| G06F 13/16 | (2006.01) |
| G06F 1/12 | (2006.01) |
| G06F 5/06 | (2006.01) |
| G06F 13/38 | (2006.01) |

(52) U.S. Cl.
CPC ............. *G06F 5/16* (2013.01); *G06F 1/12* (2013.01); *G06F 5/065* (2013.01); *G06F 13/1673* (2013.01); *G06F 13/385* (2013.01); *G06F 13/4022* (2013.01)

(58) Field of Classification Search
CPC .................. G06F 13/385; G06F 13/4022
See application file for complete search history.

(56) References Cited

U.S. PATENT DOCUMENTS

| | | | |
|---|---|---|---|
| 5,787,299 A | 7/1998 | Ostler et al. | |
| 5,799,208 A | 8/1998 | Hwang et al. | |
| 5,884,102 A | 3/1999 | England et al. | |
| 5,944,803 A * | 8/1999 | Whitehouse | C12N 9/12 379/156 |
| 6,700,403 B1 | 3/2004 | Dillon | |
| 7,102,394 B1 | 9/2006 | Wilson et al. | |
| 7,162,549 B2 | 1/2007 | Mambakkam et al. | |

OTHER PUBLICATIONS

International Search Report and Written Opinion—PCT/US2016/016454 ISA/EPO—Mar. 5, 2016.

* cited by examiner

*Primary Examiner* — Zachary K Huson
(74) *Attorney, Agent, or Firm* — Haynes and Boone, LLP (57) ABSTRACT

A line multiplexed UART interface is provided that multiplexes a UART transmit and CTS functions on a transmit pin and that multiplexes a UART receive and RTS functions on a receive pin. In this fashion, the conventional need for an additional RTS pin and an additional CTS pin is obviated such that the line multiplexed UART interface uses just the transmit pin and the receive pin.

20 Claims, 7 Drawing Sheets

LINE-MULTIPLEXED UART

TECHNICAL FIELD

This application relates to a universal asynchronous receiver transmitter (UART), and more particularly to a line-multiplexed UART.

BACKGROUND

Conventional microprocessors typically include a universal asynchronous receiver transmitter (UART) interface for communicating with other entities. The UART interface uses an oversampling clock that is conventionally 16 times the bit rate such that each received bit is represented by sixteen samples. To send a binary one under the UART transmission protocol, the transmitting UART interface drives its TX pin to the power supply voltage VDD for the duration of the bit period as determined by sixteen cycles of its oversampling clock. The receiving UART interface counts its bit period using its own oversampling clock. Transmission of a logical zero is analogous in that the transmitting UART interface grounds its transmit pin for the duration of the bit period as determined by its oversampling clock (sixteen cycles). The resulting data transmission is in frames of eight bits and may include parity and check-sum bits.

Figure 1:
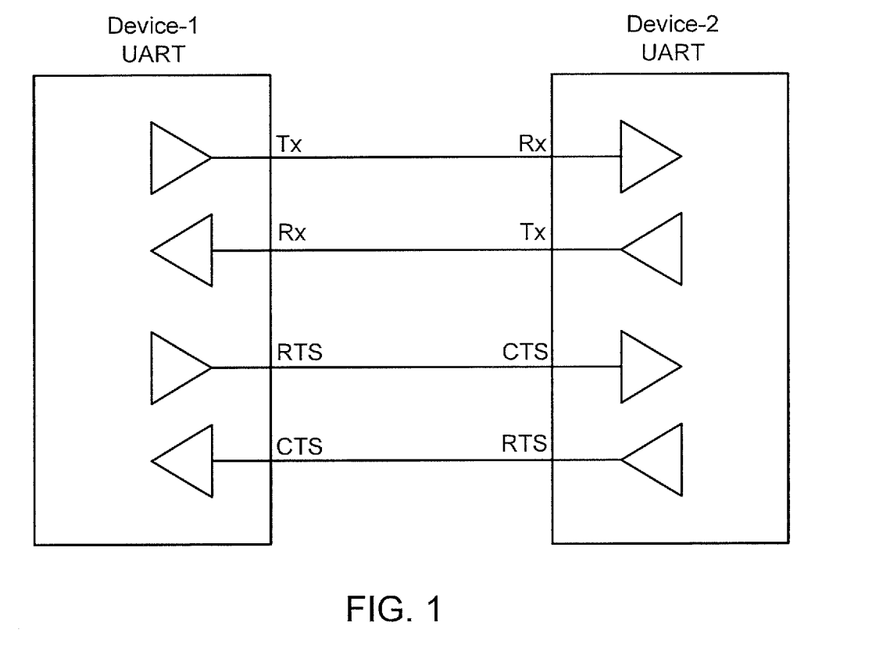
FIG. 1 is a block diagram of conventional UART interfaces in a pair of devices.

The UART transmission protocol with hardware flow control may be better understood with reference to FIG. 1, which illustrates the UART interfaces for device 1 and a device 2. Each UART interface has four pins or terminals: a transmit pin TX, a receive pin RX, a request to send (RTS) pin, and a clear to send (CTS) pin. The transmit pin for each device couples to the receive pin for the opposing device. Similarly, the RTS pin for each device couples to the CTS pin for the opposing device. Suppose that device 1 is ready to receive data from device 2. It would then assert the voltage on its RTS pin so that the resulting asserted voltage is received on the CTS pin for device 2. Should device 2 have a frame of data to send, it would then send the data frame over its TX pin to be received on the RX pin for device 1. The transmission protocol for transmitting data from device 1 to device 2 is analogous in that device 1 can only send a frame of data if device 2 has asserted a voltage on its RTS pin. The resulting transmission protocol advantageously requires no software intervention or control. Processor(s) in either device are thus relieved of any management burden with regard to the UART data transmission.

Although UART interfaces are simple and relatively robust, an integrated circuit needs to require four pins for their implementation. These extra pins add cost and complexity to the resulting integrated circuit. Accordingly, there is a need in the art for UART interfaces having a reduced number of pins.

SUMMARY

To eliminate the conventional need for four pins for a UART interface, a "line-multiplexed" UART interface is provided in which the UART transmit buffer as well as the UART clear to send (CTS) buffer both function using a shared transmit pin. Similarly, the UART receive buffer as well as the UART request to send (RTS) control circuit both function using a shared receive terminal. In this fashion, both the conventional RTS pin and the conventional CTS pin may be eliminated.

These advantageous features and additional advantageous features may be better appreciated with regard to the following detailed description of example embodiments.

BRIEF DESCRIPTION OF THE FIGURES

Embodiments of the present disclosure and their advantages are best understood by referring to the detailed description that follows. It should be appreciated that like reference numerals are used to identify like elements illustrated in one or more of the figures.

DETAILED DESCRIPTION

To increase density and reduce the pin count, a modified UART interface is provided in which the flow control is embedded in the signaling between the transmit (TX) pin and the corresponding receive (RX) pin. In contrast, a conventional UART system requires an additional request to send (RTS) pin to accommodate the transmission of the RTS messaging and an additional clear to send (CTS) pin to accommodate the receipt of the RTS messaging. Because the RTS/CTS flow control is embedded in the signaling over the TX and RX pins, the resulting modified UART interfaces are denoted herein as "line-multiplexed" UART interfaces. As used herein, the terms "pin," "terminal," or "pad" are used interchangeably to generically refer to the input/output means by which an integrated circuit couples to external devices. The term "pin" as used herein thus encompasses pads and other alternative input/output integrated circuit structures.

Figure 2A:
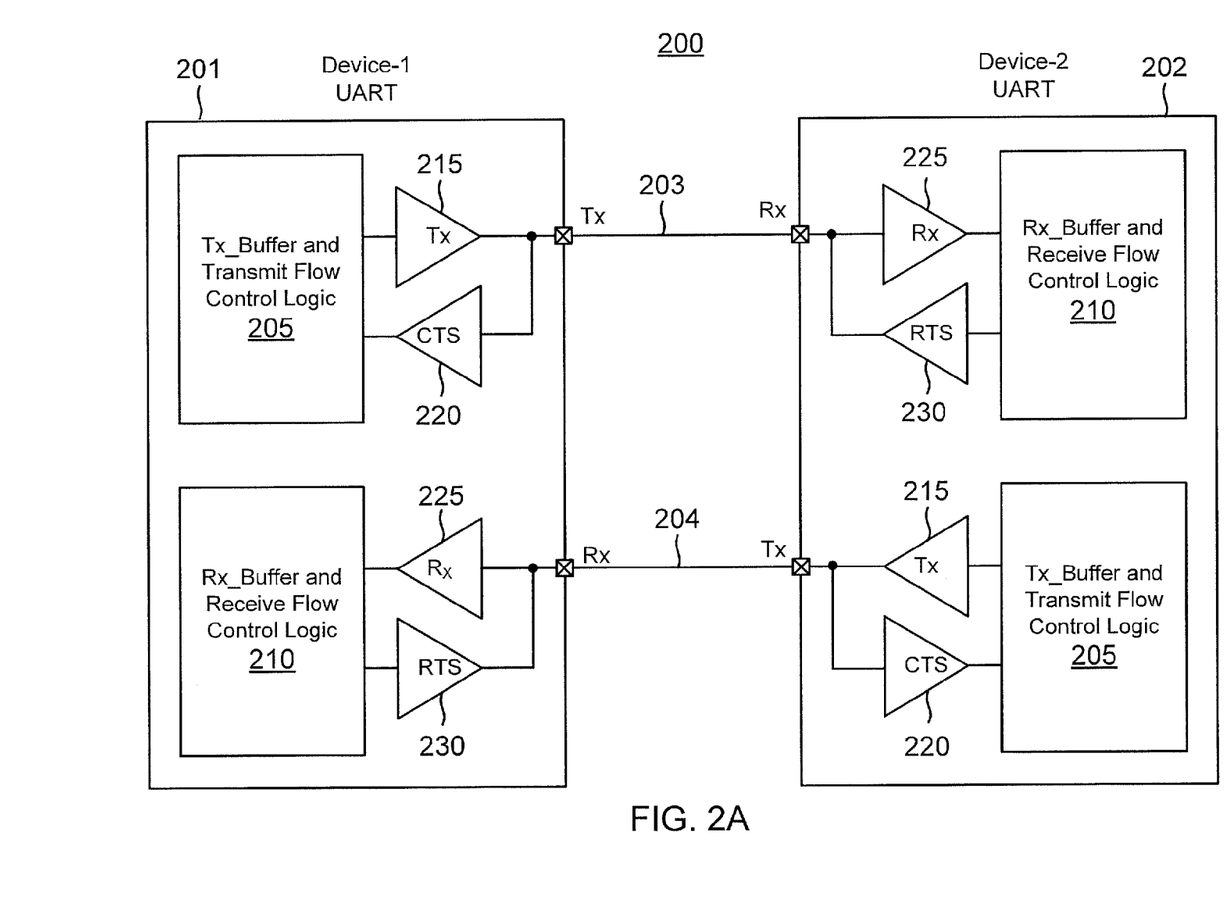
FIG. 2A is a block diagram of line-multiplexed UART interfaces in a pair of devices in accordance with an embodiment of the disclosure.

An example system 200 is shown in FIG. 2A in which a device 201 and a device 202 are both configured with line-multiplexed UART interfaces each including a transmit (TX) buffer and transmit flow control logic circuit 205 and a receive (RX) buffer and receive flow control logic circuit 210. Note that device has only two pins for its UART interface: a TX pin and an RX pin. As discussed with regard to the conventional UART interfaces of FIG. 1, each device 201 and 202 includes a TX buffer 215 for driving its TX pin. Similarly, each device 201 and 202 includes an RX buffer 225 coupled to its RX pin. A lead 203 couples the TX pin on device 201 to the RX pin on device 202. Similarly, a lead 204 couples the TX pin on device 202 to the RX pin on device 201. The CTS functionality occurs through the TX pin. Thus, device 201 and 202 each has a CTS control circuit 220 coupled to its TX pin. Similarly, the RTS functionality occurs through the RX pin. Device 201 and 202 thus each have a RTS control circuit 230 coupled to its RX pin.

As is conventional, the UART frame transmitted by TX buffer 215 ends with a stop bit in which the TX pin voltage is asserted to the power supply voltage (VDD) level. In other words, the stop bit is a binary high value. As discussed previously, it is conventional for a UART interface to use a 16× oversampling clock with regard to transmitting and receiving the UART frames. The signal transmission and reception through buffers 215 and 220 as well as control circuits 225 and 230 may be timed according to the 16× oversampling clock as is conventional in the UART arts. In that regard, to transmit a binary one, TX buffer 215 may assert the voltage of its TX pin to the power supply voltage level across 16 samples of the oversampling clock (not illustrated). With regard to this voltage assertion, TX buffer 215 is configured to have a variable output impedance to allow the multiplexing of the CTS functionality onto the TX pin. TX buffer and transmit flow logic circuit 205 thus controls the output impedance for TX buffer 215 so that during transmission of the data bits in a UART frame, TX buffer 215 has a relatively low output impedance such as 50 ohms. In an eight bit UART frame corresponding to a 16× oversampling clock, TX buffer 215 would thus have the low output impedance across the 8×16=128 sampling clock cycles for the data frame transmission, not including the stop bit. The stop bit represents an additional sixteen cycles of the oversampling clock. To ensure that each TX buffer 215 drives the beginning of the stop bit high across its lead such as leads 203 and 204, TX buffer and transmit flow logic circuit 205 controls the output impedance of TX buffer 215 to remain low for at least the initial oversampling clock cycle of the stop bit. Given this low output impedance, TX buffer 215 can then quickly assert the voltage of the TX pin (and thus the voltage of the corresponding RX pin in the receiving device through lead 203 or 204) to the power supply voltage VDD level. During the remainder of the stop bit, TX buffer and transmit flow logic circuit 205 changes the output impedance of TX buffer 215 to a relatively high level such as 10K ohms.

Figure 2B:
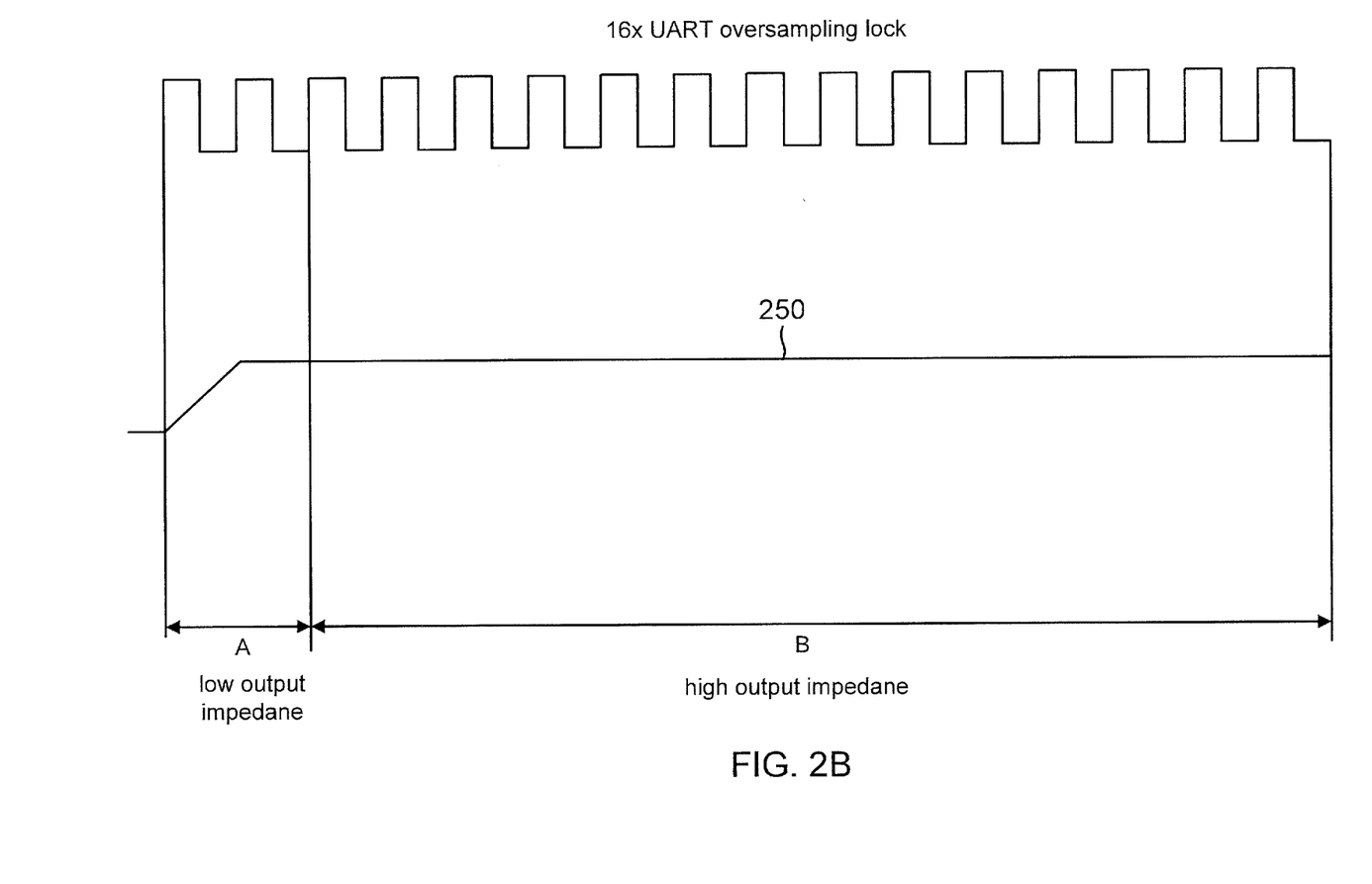
FIG. 2B is a time diagram of a stop bit transmission by a line-multiplexed UART interface in accordance with an embodiment of the disclosure.

A representative stop bit 250 is illustrated in FIG. 2B. The duration of an initial low output impedance period A and a subsequent high output impedance period B are determined responsive to cycles of the 16×UART oversampling clock. In one embodiment, the initial low output impedance period occurs during the first two cycles of the 16×UART oversampling clock. The high output impedance period would then occur over the remaining fourteen cycles of the 16×UART oversampling clock in such an embodiment. In light of the initial low output impedance period, stop bit 250 may quickly be driven to the desired logic high level.

Referring again to FIG. 2A, the output impedance control of the TX buffer allows the RTS/CTS functionality to proceed as follows. For example, suppose that device 201 had just transmitted the data bits in a UART frame and had now driven the output impedance of its TX buffer 215 high during the stop bit transmission. RX buffer and receive flow control logic circuit 210 in device 202 detects the transmission of the stop bit and determines whether device 202 is ready to receive another UART frame. As discussed previously, such a decision is routine in a conventional UART interface. Should a conventional UART device be ready to receive another UART frame, it would drive the voltage of its RTS pin to the power supply voltage VDD level at this point. This asserted voltage would then be received by a conventional transmitting UART device as a binary high CTS signal. Conversely, a conventional receiving UART device may discharge the voltage on its RTS pin if it is not ready to receive another UART frame. This conventional RTS/CTS signaling is advantageously accommodated as disclosed herein without using separate RTS and CTS pins. To achieve this density enhancement, RTS control circuit 230 is configured to have two selectable input impedances just as TX buffer 215 has two selectable output impedances. For example, RTS control circuit 230 may have a low input impedance such as 50 ohms and a high input impedance such as 10K ohms.

To control the flow of received UART frames, RX buffer and receive flow control logic circuit 210 controls the input impedance for RTS control circuit 230. Continuing with the example of device 201 having transmitted the data bits in a UART frame and the initial cycle(s) of the frame's stop bit at a low output impedance that is then switched to a high impedance for the remaining stop bit sampling cycles, it may be the case that device 202 is unable to currently receive anymore UART frames. For example, device 202 may have a receiving FIFO buffer (discussed further below) that is full and thus unable to store anymore UART frames. In such a case, RX buffer and receive flow control logic circuit 210 would command its RTS control circuit 230 into the low input impedance state after the initial sampling cycle(s) of the stop bit transmission. Since the TX buffer 215 in device 201 would be in the high output impedance state at that time, the low input impedance of the RTS control circuit 230 in device 202 would quickly deplete the charge on its RTS pin and thus lower the voltage at the TX pin for device 201. A CTS control circuit in device 201 detects the drop in voltage on its TX pin and signals its TX buffer and transmit flow control logic circuit 205 to refrain from sending an additional UART frame. In the default state between UART frame transmissions, each TX buffer 215 is configured to drive its TX pin to the supply voltage level through the high output impedance. At some point, device 202 would clear its receive buffer such that RX buffer and receive flow control logic circuit 210 would command its RTS control circuit 230 to again assume its default input high input impedance mode. The drive from TX buffer 215 in device 201 would then recover the voltage on its TX pin, which is detected by the corresponding CTS control circuit 220 analogously to the detection of the asserted CTS signal in a conventional UART interface. Upon detecting the high voltage on its TX pin, CTS control circuit 220 in device 201 would then signal this high voltage detection to the corresponding TX buffer and transmit flow control logic circuit 205. In response, TX buffer and transmit flow control logic circuit 205 may initiate another UART frame transmission.

If the FIFO buffer in device 202 were not full, its RX buffer and receive flow control logic circuit 210 would not change the default high input impedance mode for its RTS control circuit 230. The TX buffer 215 in device 201 would then maintain its TX pin at a high voltage for the duration of the stop bit. This high voltage is detected by CTS control circuit 220 in device 201 so that its TX buffer and transmit flow control logic circuit 205 would initiate another UART frame transmission without any lull or waiting period. These advantageous properties may be better appreciated with regard to the following example embodiments for TX buffer and transmit flow control logic circuit 205 and RX buffer and receive flow control logic circuit 210.

Figure 3A:
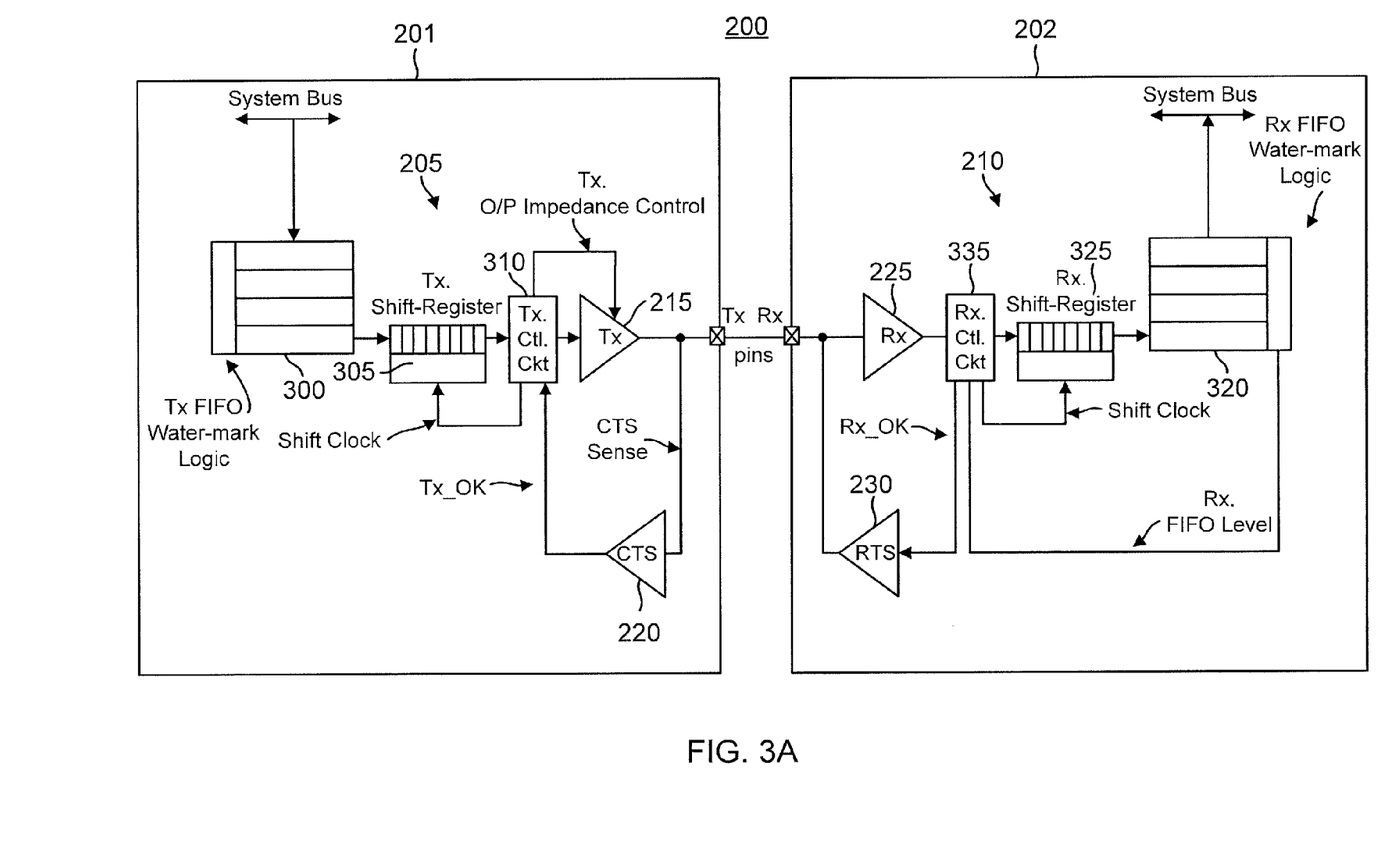
FIG. 3A is a more detailed diagram of the UART interfaces in the devices of FIG. 2A.

A more detailed view of system 200 is shown in FIG. 3A. Both device 201 and device 202 are integrated circuits. For illustration clarity, only the transmitting circuitry is shown in device 201 whereas device 202 shows only its receiving circuitry. TX buffer and transmit flow control logic circuit 205, TX buffer 215, CTS control circuit 220, and a transmit FIFO buffer 300 are thus shown only in device 201. Conversely, RX buffer and receive flow control logic circuit 210, RX buffer 225, RTS control circuit 230, and a receive FIFO buffer 320 are shown only in device 202. A processor or other data source (not illustrated) in device 201 provides UART data words through a system bus to transmit FIFO 300. As is conventional, each FIFO 300 and 320 may include FIFO water-mark logic to monitor its ability to receive additional data. According to its first-in-first-out logic, transmit FIFO 300 will then load its earliest-loaded UART data word into a transmit shift register 305. A transmit control circuit 310 strobes shift register 305 to shift in its UART data word using a shift clock that cycles every according to a period of sixteen cycles of the 16× oversampling clock (not illustrated). Transmit control circuit 310 receives the shifted-in bits from shift register 305 and controls TX buffer 215 to drive the voltage of the TX pin according to the binary value of the shifted-in bits. For example, TX buffer 215 may be controlled to drive its TX pin with the power supply voltage VDD over sixteen cycles of the 16× oversampling clock to transmit a binary one data bit. Conversely, TX buffer 215 may be controlled to ground its TX pin over sixteen cycles of the 16× oversampling clock to transmit a binary zero data bit.

During the data bit transmission in a UART frame, transmit control circuit 310 commands TX buffer 215 to use its low output impedance. In addition, transmit control circuit 310 commands TX buffer 215 to use its low output impedance over some initial portion of the subsequent stop bit such as over one or two cycles of the 16× oversampling clock. Transmit control circuit 310 then commands TX buffer 215 to uses its high output impedance for the remainder of the stop bit transmission and also during any waiting period between UART frame transmissions. During the remainder of the stop bit transmission, CTS control circuit 220 then detects whether the transmit pin voltage is a binary one or a binary zero using some threshold level such as VDD/2. CTS control circuit 220 may then drive its output signal (TX OK) accordingly. In response to CTS control circuit 220, for example, grounding its output signal, transmit control circuit 310 will not strobe shift register 305 to shift in the next UART data word until CTS control circuit 220 again detects that the TX pin voltage is a binary high value such that it asserts it output signal accordingly. Transmit control circuit 310 would then command TX buffer 215 into its low output impedance state to begin another UART frame transmission (assuming there is one to transmit, which depends upon the state of transmit FIFO buffer 300).

In device 202, RX buffer 225 will typically have a relatively high input impedance, comparable to the high output impedance mode of TX buffer 215. For example, RX buffer 225 may comprise an inverter (or a comparator) in which the received signal from the RX pin drives the gates of the inverter transistors. Since MOSFET transistors present a relatively high impedance at their gates, the resulting RX buffer 225 has a correspondingly high input impedance. Based upon the binary state of the received voltage signal on the RX pin, RX buffer 225 drives an output bit to a receive control circuit 225 that in turn shifts the output bit into a receive shift register 325 responsive to a strobe of a shift clock. As discussed with regard to transmit control circuit 310, receive control circuit 335 receives a 16× oversampling clock (not illustrated). In alternate embodiments, other oversampling clock frequencies may be used. The shift clock strobing of receive shift register 325 may occur every sixteen cycles of the 16× oversampling clock. Once an entire UART data word in loaded into shift register 325, the UART data word may be shifted into a receive FIFO buffer 320 so that it may be eventually presented in parallel over a system bus to a processor or other data sink (not illustrated) in device 202.

Receive control circuit 335 controls the output impedance of RTS control circuit 230 in device 202. During a default mode such as when receiving the UART data bits and the initial portion of the stop bit, receive control circuit 335 commands RTS control circuit 230 to use a relatively high output impedance such as 10K ohms. During this default mode, RTS control circuit 230 is thus effectively isolated from affecting the voltage of the RX pin. Receive control circuit 335 detects the beginning of a received stop bit and checks a receive (RX) FIFO level within receive FIFO buffer 320 to determine if receive FIFO buffer 320 has sufficient storage available to receive another UART word. Like transmit FIFO buffer 300, receive FIFO buffer 320 may include water-mark logic or other suitable circuits to generate the RX FIFO level signal. If there is sufficient storage available, receive control circuit 335 does not change the default high output impedance for RTS control circuit 230 over the remainder of the start bit. But if there is not sufficient storage available, receive control circuit 335 changes the output impedance of RTS control circuit 230 to a relatively low level such as 50 ohms. The resulting voltage divider caused by the relatively low output impedance of RTS control circuit 230 compared to the relatively high output impedance of transmit buffer 215 causes RTS control circuit 230 to rapidly deplete the charge on its RX pin as well as on the TX pin for device 201. The CTS control circuit 220 in device 201 then detects this voltage drop so that device 201 goes into a waiting mode in which it refrains from sending an additional UART frame until the TX pin voltage is restored. RX control circuit 335 in device 202 determines when the RX FIFO level indicates that there is storage capability to receive another UART frame, whereupon RX control circuit 335 commands RTS control circuit 230 to resume its default high output impedance. The resulting recovery of the voltage at the TX pin of device 201 then triggers the transmission of another UART frame.

In one embodiment, TX buffer and transmit flow control logic circuit 205 may be deemed to comprise a first means for multiplexing a UART transmit buffer to transmit UART frames over a transmit terminal and for multiplexing a clear to send (CTS) control circuit to receive a CTS signal over the transmit terminal. Similarly, RX buffer and receive flow control logic may be deemed to comprise a second means for multiplexing a UART receive buffer to receive UART frames over a receive terminal and for multiplexing a request to send (RTS) control circuit to transmit an RTS signal over the receive terminal.

Figure 3B:
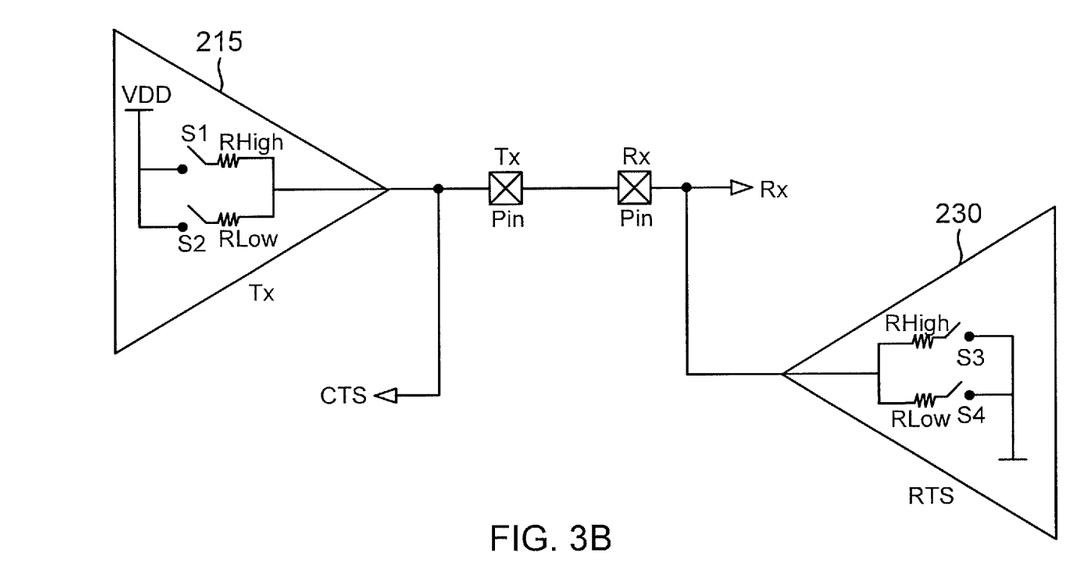
FIG. 3B illustrates the impedance switching circuits in the UART interfaces of FIG. 3A.

An example embodiment for TX buffer 215 and RTS control circuit 230 is shown in FIG. 3B. A switch S1 in TX buffer 215 couples to the TX buffer output through a resistor RHigh. Similarly, another switch S2 couples to the TX buffer output through a resistor RLow. The resistance of RHigh is relatively high such as 10K ohms whereas the resistance of resistor RLow is much lower such as 50 ohms. During the transmission of the UART data bits, switch S2 in TX buffer 215 is closed whereas switch S1 is opened. This provides TX buffer with the relatively low output impedance discussed above. Similarly, switch S1 is closed and switch S2 opened to provide the relatively high output impedance. An analogous arrangement of switches S3 and S4 along with another pair of resistors RHigh and RLow in RTS control circuit 230 provides its desired low and high input impedances.

Figure 4:
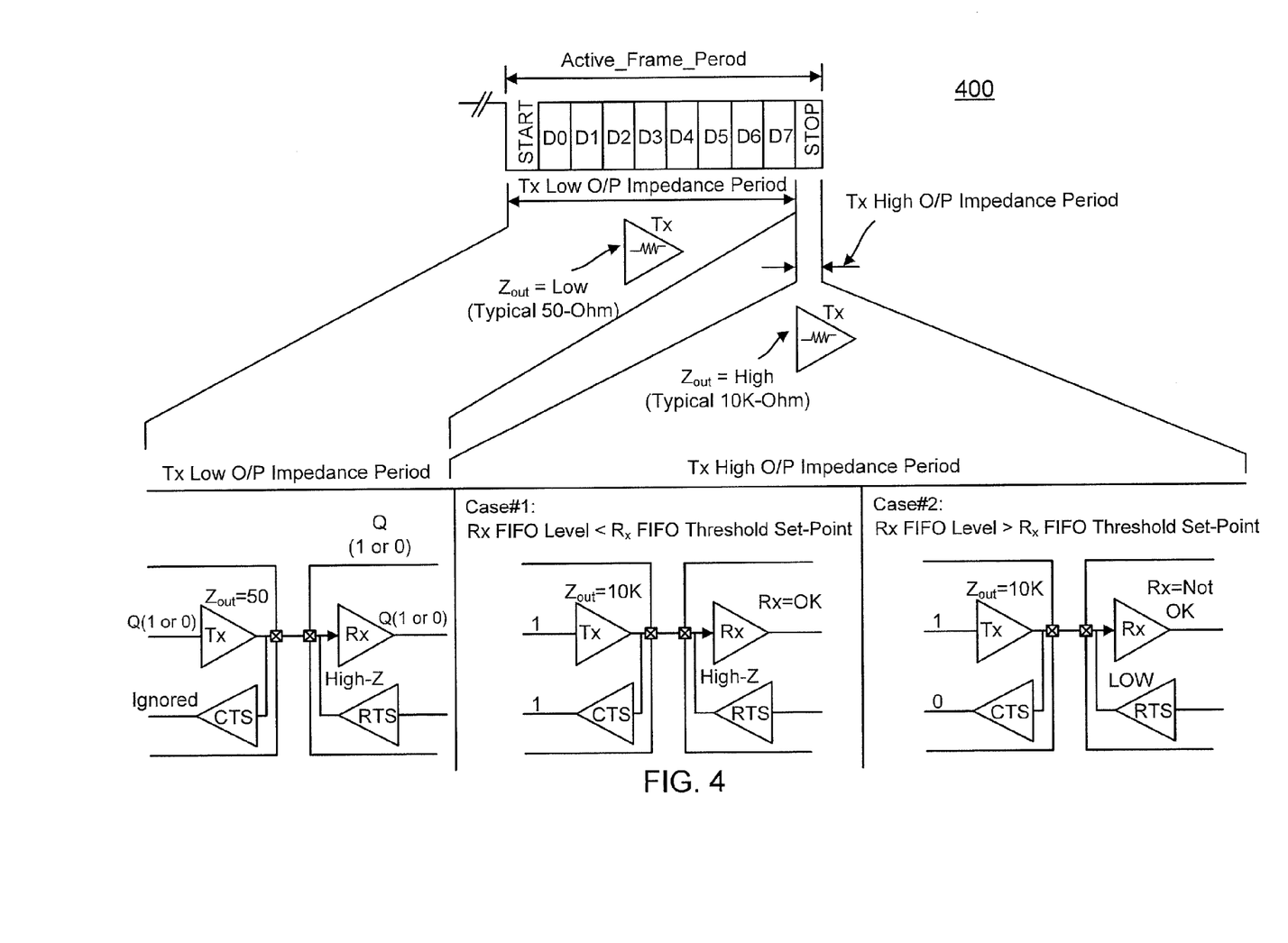
FIG. 4 illustrates the low impedance period and high impedance period for a UART frame in accordance with an embodiment of the disclosure.

An example UART frame transmitted by device 201 or 202 is shown in FIG. 4. In addition, the impedance states for the TX buffer in the transmitting device and for the RTS control circuit in the receiving device are also shown. In this embodiment, the frames are eight bits long but such length may be varied in alternative embodiments. As is customary in the UART arts, the transmitting UART device begins the frame by pulling its TX pin low for a start bit duration. Like the data bits and the stop bit in the frame, the start bit may have a period of sixteen cycles of the 16× oversampling clock. In alternative embodiments, a different sampling clock rate may be used to time the duration of the bits in the UART frame. The data bits may then be transmitted followed by a stop bit that always pulls the TX pin high.

As is also customary in the UART arts, the receiving UART device samples the received frame using an oversampling clock such as the 16× oversampling clock. During the transmission of the start bit, the UART data bits, and an initial portion of the stop bit, the TX buffer in the transmitting device uses its low output impedance. During this time, the RTS control circuit in the receiving device uses its high input impedance so that the TX buffer can quickly swing the voltage of its TX pin to the appropriate binary value (VDD or ground) responsive to the data bit contents. In addition, the TX buffer can also quickly charge the TX pin to VDD during the initial portion of the stop bit such as over one cycle of the 16× oversampling clock. Over the remaining cycles of the oversampling clock for the stop bit as discussed previously with regard to FIG. 2B, the TX buffer uses its high output (O/P) impedance. There are two receiver states illustrated in FIG. 4 for this TX buffer high output impedance period of the stop bit. In a first state (Case #1), the RX FIFO level is below a FIFO threshold set point such as determined within the receiver control circuit (not illustrated). Such a condition indicates that there is storage capability within the receive FIFO buffer (not illustrated). The RTS control circuit in the receiving device thus maintains its default high output impedance for the duration of the stop bit. In a second state (Case #2), the RX FIFO level is greater than a FIFO threshold set point. As discussed above with regard to stop bit 250 of FIG. 2B, the TX buffer initially drives the beginning of the stop bit using a low output impedance. For example, the TX buffer may drive the TX pin with a high voltage to begin the stop bit using a low output impedance for the first two cycles of the oversampling clock. For the remaining cycles of the oversampling clock of the stop bit, the TX buffer drives the TX pin with a high output impedance. Because the TX buffer initially drives the stop bit using a low output impedance, the TX buffer pulls the TX pin voltage (and thus the RX pin voltage for the receiving node) to the power supply voltage VDD very quickly. With the voltage established high, the transmitter can then drive the remainder of the stop bit using a high output impedance.

In response to detecting the high voltage of the RX pin for the stop bit, the RTS control circuit in the receiving node can do one of two things: it may couple the RX pin to ground through a low input impedance or through a high input impedance. The RTS control circuit makes such a selection responsive to whether the receiving UART interface is ready to receive another frame. If the receiving UART interface is ready to receive a frame (indicated in FIG. 4 as an RX=OK condition for Case #1), the RTS control circuit couples the RX pin to ground through a high input impedance, preferably a high impedance that is considerably larger than the high output impedance used in the TX buffer. The result is that the TX buffer and the RTS control circuit form a voltage divider that maintains the RX pin voltage high if the receiving UART interface is ready to receive a frame. The transmitting UART interface senses this high voltage through its CTS control circuit. If the CTS control circuit senses that its TX pin voltage is high during the high output impedance portion of the stop bit period, the transmitting UART interface is free to send another frame of data.

If, on the other hand, the receiving UART interface is not ready to receive another frame of data (as indicated in FIG. 4 by an RX=Not OK condition for Case #2), the RTS control circuit couples the RX pin to ground through a relatively low impedance while it receives the stop bit. Because the TX buffer is driving the TX pin high though a high output impedance, the result is that the RX and TX pin voltages will be substantially discharged to ground, which is interpreted by the transmitting device as a CTS signal=0 condition. The CTS control circuit in the transmitting UART interface senses this low voltage on its TX pin as a conventional UART interface would sense a low state of the (now non-existent) CTS pin such that the transmitting device will refrain from sending another frame of data. When the RTS control circuit in the receiving UART interface couples its RX pin to ground through its high input impedance as in Case #1 of FIG. 4, the transmitting UART interface may proceed to transmit another frame. An example method of operation for a line-multiplexed UART interface will now be discussed.

Figure 5:
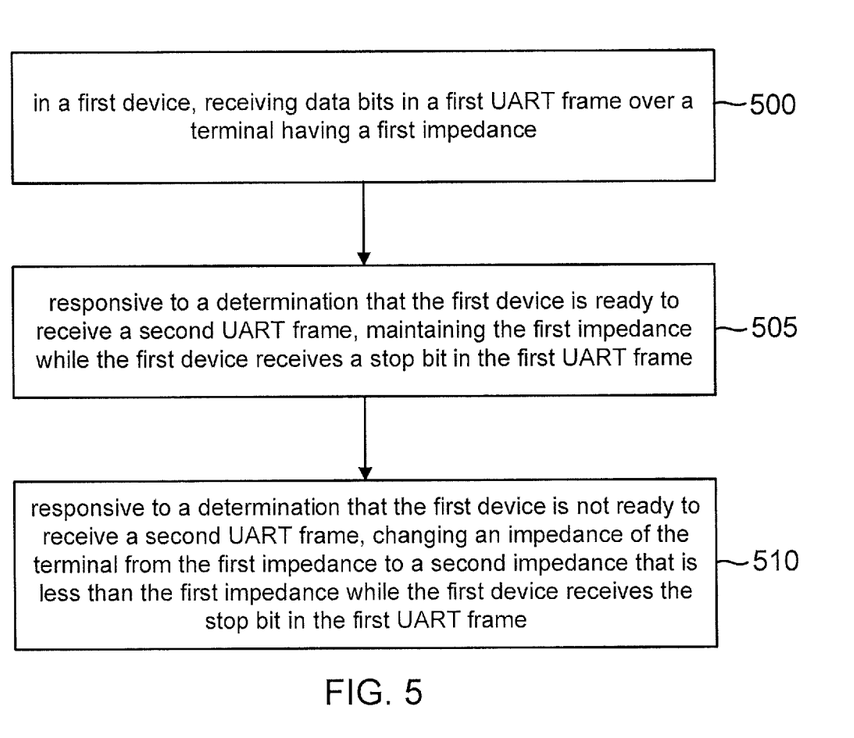
FIG. 5 is a flowchart for an example method of operation for a line-multiplexed UART interface in accordance with an embodiment of the disclosure.

A flowchart for an example method of operation for a line-multiplexed UART interface in a first device is shown in FIG. 5. An initial act 500 comprises receiving data bits in a first UART frame over a terminal having a first input impedance for a first device. The receipt of data bits in a UART frame over a "High-Z" input impedance as shown in FIG. 4 for Case #1 is an example of act 500. In addition, the method includes an act 505 that is responsive to a determination that the first device is ready to receive a second UART frame and comprises maintaining the first input impedance while the first device receives a stop bit in the first UART frame. The case #1 illustrated in FIG. 4 is an example of act 505 in which the RTS control circuit in the receiving device maintains its default high input impedance (and thus a default high input impedance for its RX pin) during the receipt of the remaining bulk of the stop bit. Finally, the method includes an act 510 that is responsive to a determination that the first device is not ready to receive a second UART frame and comprises changing an input impedance of the terminal from the first input impedance to a second input impedance that is less than the first impedance while the first device receives the stop bit in the first UART frame. The case #2 illustrated in FIG. 4 is an example of act 510 in which the RTS control circuit in the receiving device switches to its low input impedance during the receipt of the remaining bulk of the stop bit.

Note that the devices of FIG. 2A may also be configured with conventional RTS and CTS pins such that they may be backwardly compatible with conventional UART signaling as discussed with regard to FIG. 1. In addition, the hardware flow control through impedance control as discussed herein may be applied to other communication interfaces besides UART.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. An integrated circuit, comprising:
   a universal asynchronous receiver transmitter (UART) transmit terminal;
   a transmit buffer coupled to the UART transmit terminal, the transmit buffer being configured to select for an output impedance from the group consisting of a first output impedance and a second output impedance, the first output impedance being greater than the second output impedance; and
   a clear to send (CTS) control circuit configured to detect a CTS signal received on the UART transmit terminal.

2. The integrated circuit of claim 1, further comprising: a transmit control circuit configured to command the transmit buffer to select for the first output impedance while the transmit buffer is transmitting data bits in a first UART frame over the transmit terminal to a remote integrated circuit.

3. The integrated circuit of claim 2, wherein the transmit control circuit is further configured to command the transmit buffer to select for the first output impedance while the transmit buffer is transmitting an initial portion of a stop bit following the data bits in the first UART frame and to command the transmit buffer to select for the second output impedance while the transmit buffer is transmitting a remaining portion of the stop bit.

4. The integrated circuit of claim 2, further comprising:
   a shift register configured to shift the data bits of the first UART frame to the transmit buffer.

5. The integrated circuit of claim 4, further comprising:
   a transmit FIFO buffer configured to provide the first UART frame to the shift register.

6. The integrated circuit of claim 2, wherein the transmit control circuit is further configured to command the transmit buffer to transmit a second UART frame responsive to the CTS control circuit detecting an assertion of the CTS signal.

7. The integrated circuit of claim 6, wherein the transmit control circuit is further configured to command the transmit buffer to refrain from transmitting a second UART frame responsive to the CTS control circuit detecting a de-assertion of the CTS signal.

8. The integrated circuit of claim 1, further comprising:
   a receive terminal;
   a receive buffer configured to receive a second UART frame from a remote integrated circuit over the receive terminal;
   a request to send (RTS) control circuit coupled to the receive terminal, the RTS control circuit being configured to select for an input impedance from the group consisting of a first input impedance and a second input impedance, the first input impedance being greater than the second input impedance.

9. The integrated circuit of claim 8, wherein the first output impedance equals the first input impedance, and wherein the second output impedance equals the second input impedance.

10. The integrated circuit of claim 1, wherein the first output impedance is at least 10,000 ohms and wherein the second output impedance is no more than 50 ohms.

11. The integrated circuit of claim 8, further comprising:
    a receive control circuit configured to command the RTS control circuit to select for the first input impedance while the receive terminal is receiving data bits in the second UART frame.

12. The integrated circuit of claim 11, wherein the receive control circuit is further configured to command the RTS control circuit to select for the first input impedance while the receive terminal is receiving an initial portion of the stop bit following the data bits in the second UART frame.

13. The integrated circuit of claim 12, wherein the receive control circuit if further configured to command the RTS control circuit to select for the second input impedance while the receive control circuit is receiving a remaining portion of the stop bit in the second UART frame responsive to a determination that the integrated circuit is not ready to receive an additional UART frame.

14. A method, comprising:
    in a first device, receiving data bits in a first UART frame over a terminal having a first input impedance;
    maintaining the first input impedance while the first device receives an initial portion of a stop bit in the first UART frame; and
    responsive to a determination that the first device is not ready to receive a second UART frame, changing an input impedance of the terminal from the first input impedance to a second input impedance that is less than the first input impedance while the first device receives a remaining final portion of the stop bit in the first UART frame.

15. The method of claim 14, further comprising:
    responsive to a determination that the first device is ready to receive the second UART frame, maintaining the first input impedance while the first device receives the remaining final portion of the stop bit.

16. The method of claim 14, wherein maintaining the first input impedance comprises commanding a receive to send (RTS) control circuit coupled to the terminal to select for an input impedance equaling the first input impedance.

17. An integrated circuit, comprising:
    a transmit terminal; and
    a first means for multiplexing a UART transmit buffer to transmit UART frames over the transmit terminal and for multiplexing a clear to send (CTS) control circuit to receive a CTS signal over the transmit terminal.

18. The integrated circuit of claim 17, further comprising:
    a receive terminal;
    a second means for multiplexing a UART receive buffer to receive UART frames over the receive terminal and for multiplexing a request to send (RTS) control circuit to transmit an RTS signal over the receive terminal.

19. The integrated circuit of claim 18, wherein the second means is configured to multiplex the RTS control circuit to transmit the RTS signal over the receive terminal by selecting between a first input impedance and a second input impedance for the RTS control circuit.

20. The integrated circuit of claim 19, wherein the second means is configured to transmit the RTS signal during a final portion of a stop bit.

* * * * *